United States Patent
Williams

(10) Patent No.: US 8,950,049 B2
(45) Date of Patent: Feb. 10, 2015

(54) FASTENER FEED METHOD AND APPARATUS

(75) Inventor: Neal Sean Williams, Queensland (AU)

(73) Assignee: Henrob Limited, Flintshire (GB)

( * ) Notice: Subject to any disclaimer, the term of this patent is extended or adjusted under 35 U.S.C. 154(b) by 964 days.

(21) Appl. No.: 13/122,647

(22) PCT Filed: Oct. 8, 2009

(86) PCT No.: PCT/GB2009/002407
§ 371 (c)(1),
(2), (4) Date: Apr. 5, 2011

(87) PCT Pub. No.: WO2010/041018
PCT Pub. Date: Apr. 15, 2010

(65) Prior Publication Data
US 2011/0252626 A1    Oct. 20, 2011

(30) Foreign Application Priority Data

Oct. 8, 2008    (GB) .................................. 0818401.2

(51) Int. Cl.
*B23Q 17/00*    (2006.01)
*B21J 15/32*    (2006.01)
*B23P 19/00*    (2006.01)

(52) U.S. Cl.
CPC .............. *B21J 15/32* (2013.01); *B23P 19/001* (2013.01)
USPC .................. 29/407.05; 29/771; 29/809; 227/3

(58) Field of Classification Search
USPC .............. 29/407.05, 701, 709, 771, 787, 788, 29/809, 811.2, 816, 818; 221/1; 227/3
See application file for complete search history.

(56) References Cited

U.S. PATENT DOCUMENTS

| 4,044,462 A | 8/1977 | Anselmo |
| 4,765,175 A | 8/1988 | Denham et al. |
| 5,143,216 A | 9/1992 | Aurtoi et al. |

(Continued)

FOREIGN PATENT DOCUMENTS

| DE | 3530230 | 3/1987 |
| EP | 0268462 | 5/1988 |

(Continued)

OTHER PUBLICATIONS

International Search Report for PCT/GB2009/002407, dated Mar. 8, 2010, 2 pages.

*Primary Examiner* — David Bryant
*Assistant Examiner* — Christopher M Koehler
(74) *Attorney, Agent, or Firm* — Michael Best & Friedrich LLP

(57) ABSTRACT

Fasteners, such as rivets, are fed to a fastener insertion tool (1) via a buffer magazine (5) adjacent to the tool. The buffer is movable with the tool and C-frame between an operative position where fasteners can be inserted int a workpiece and a re-filling position where it is docked at a docking station (13) to reload. Fasteners are delivered to the docking station from a source (14) and held there ready for when the tool docks. Once docked a transfer gat is opened at an interface between the buffer magazine (15) and the docking station (13) and fasteners from the docking station are transferred into the buffer magazine. A fastener insertion cycle is executed while the docking station is refilled with fasteners. A control cycle is used to control the quantity of fasteners loaded into a storage track at the docking station and operates to reduce overfilling of the buffer.

16 Claims, 14 Drawing Sheets

(56) References Cited

U.S. PATENT DOCUMENTS

| | | |
|---|---|---|
| 5,199,624 A | 4/1993 | Smart et al. |
| 5,235,164 A | 8/1993 | Noyama et al. |
| 5,465,868 A | 11/1995 | Bonomi |
| 5,472,087 A | 12/1995 | Rink et al. |
| 6,079,604 A | 6/2000 | Banducci et al. |
| 6,260,734 B1 | 7/2001 | Auriol et al. |
| 6,592,015 B1 | 7/2003 | Gostylla et al. |
| 6,692,213 B1 | 2/2004 | Butler |
| 6,944,944 B1 | 9/2005 | Craythorn et al. |
| 7,131,564 B2 | 11/2006 | Matthews et al. |
| 7,331,098 B2 | 2/2008 | Matthews et al. |
| 7,409,760 B2 | 8/2008 | Mauer et al. |
| 7,487,583 B2 | 2/2009 | Craythorn et al. |
| 2004/0217144 A1 | 11/2004 | Matthews et al. |
| 2006/0226194 A1* | 10/2006 | Bradbury et al. ............. 227/119 |

FOREIGN PATENT DOCUMENTS

| | | |
|---|---|---|
| EP | 0618022 | 10/1994 |
| GB | 190004967 | 1/1901 |
| WO | 9118695 | 12/1991 |
| WO | 0007751 | 2/2000 |
| WO | 2007031701 | 3/2007 |

* cited by examiner

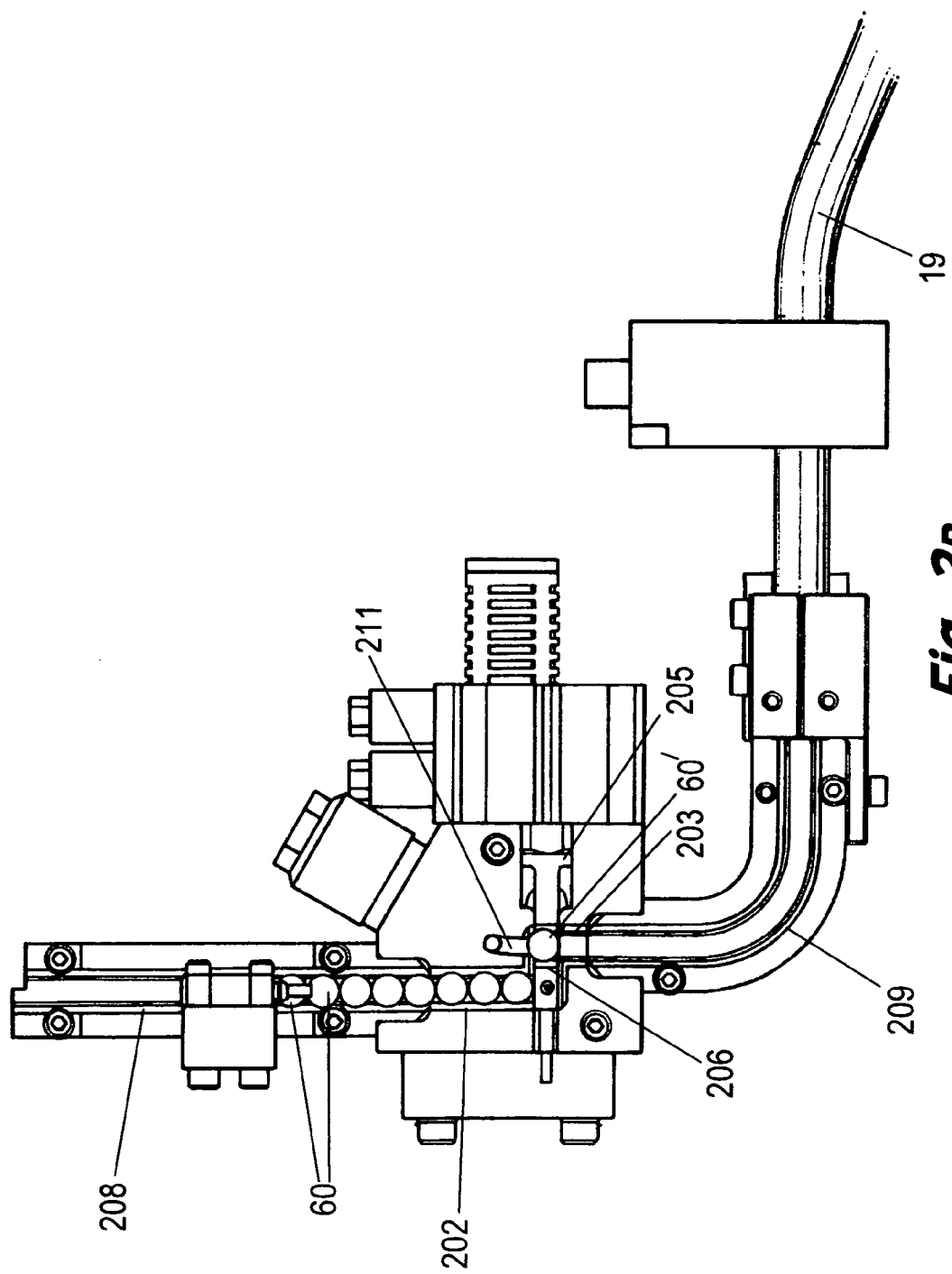

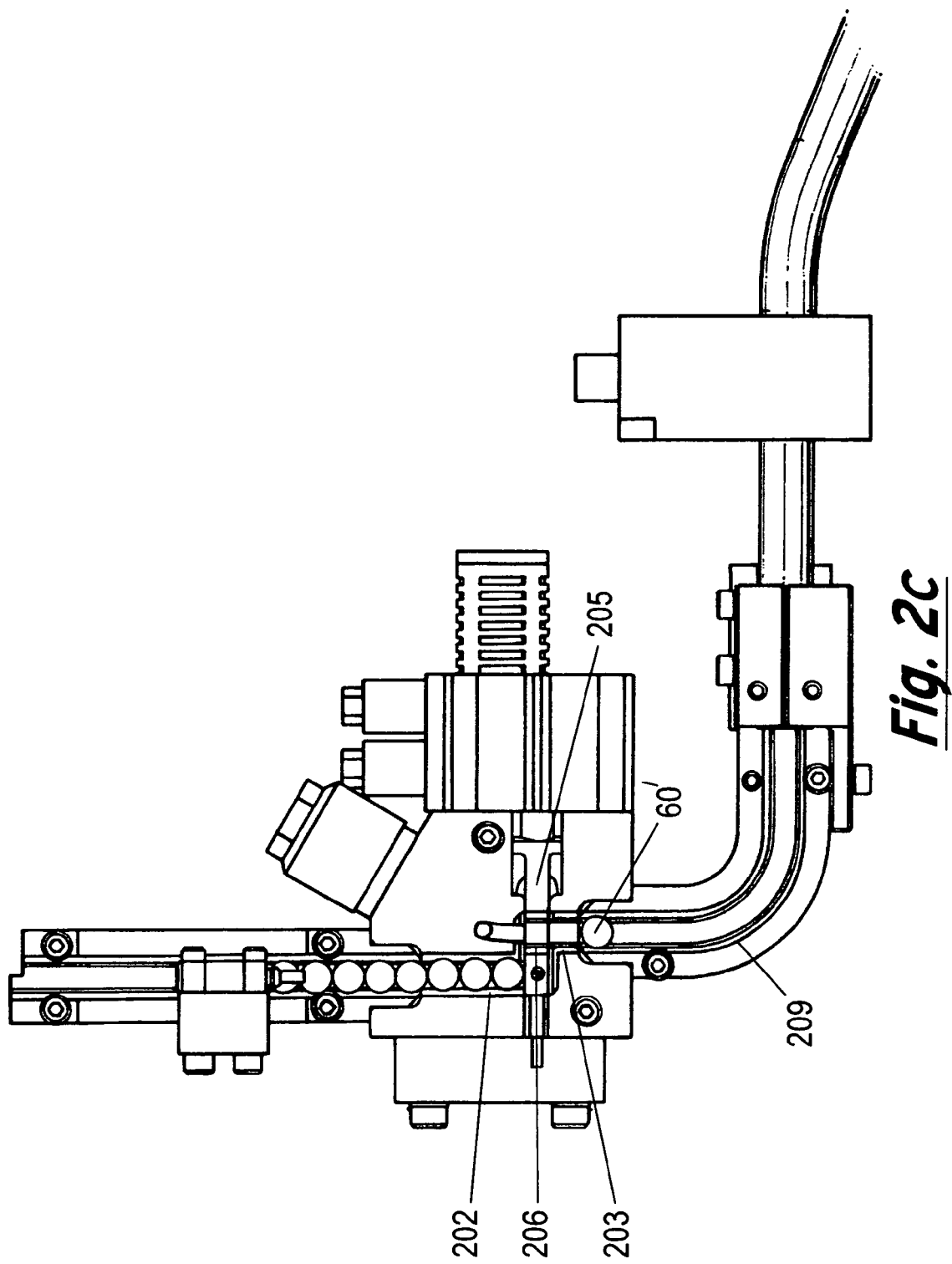

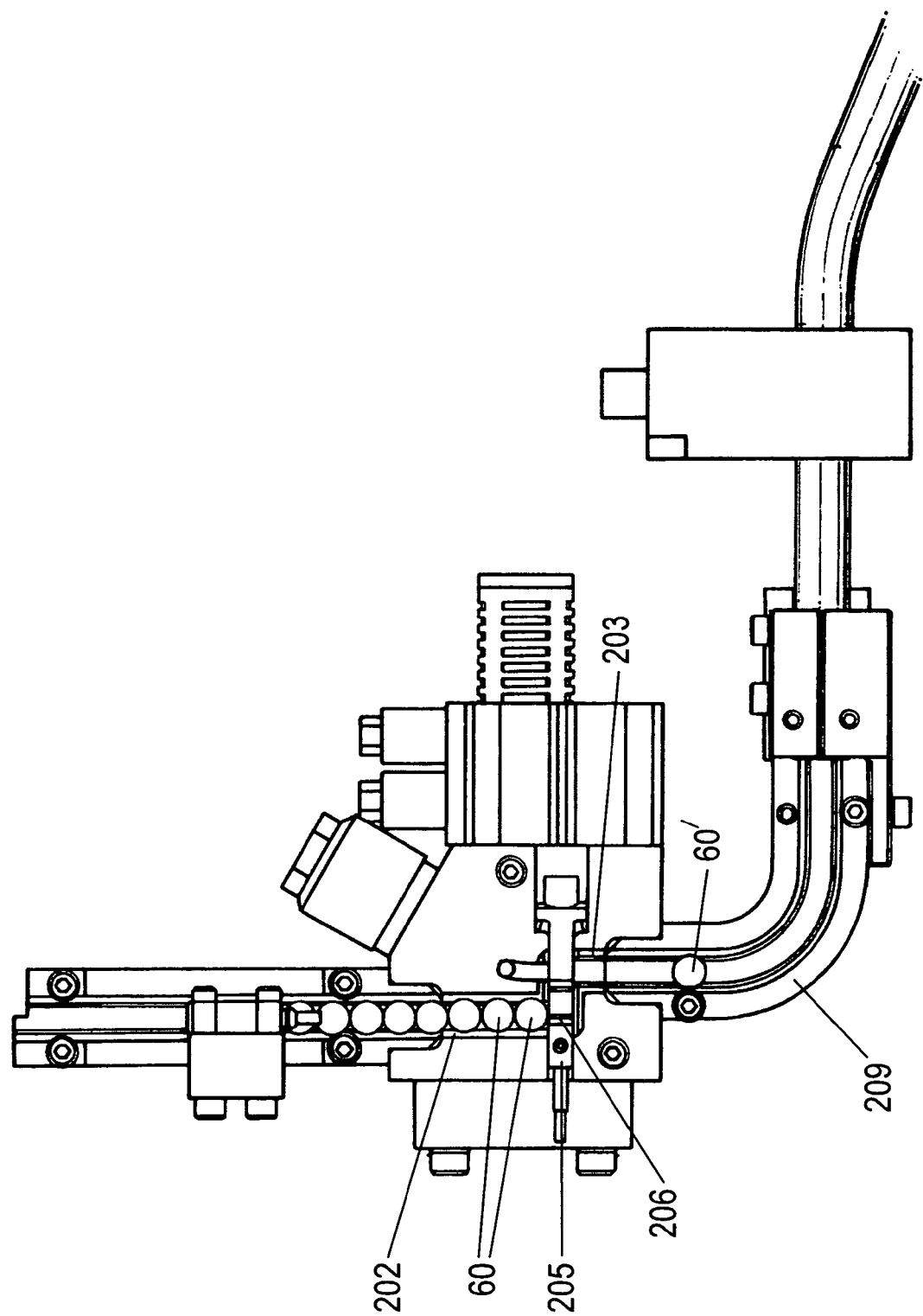

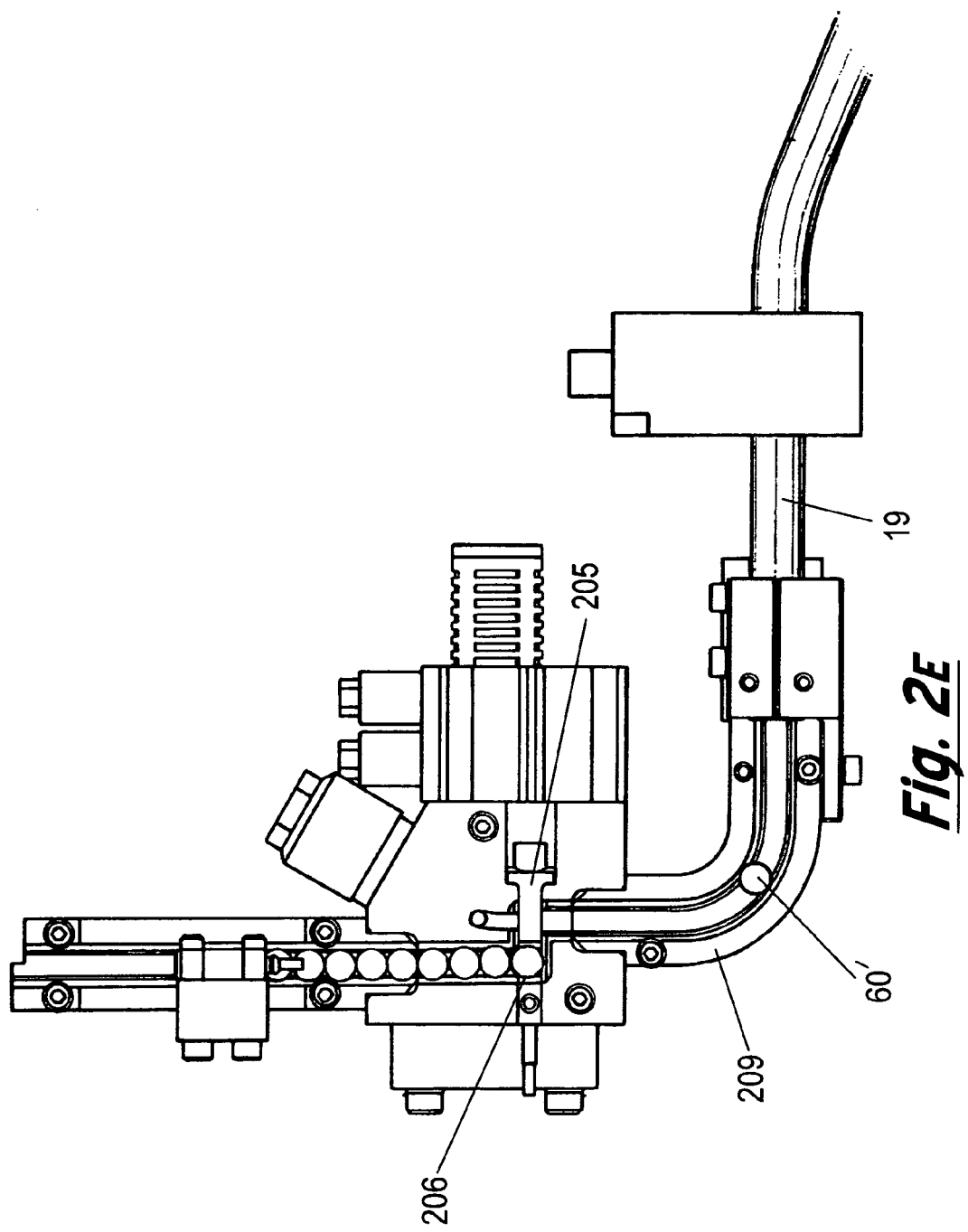

FASTENER FEED METHOD AND APPARATUS

CROSS-REFERENCE TO RELATED APPLICATIONS

This application is a U.S. national phase application filing of International Patent Application No. PCT/GB2009/002407, filed Oct. 8, 2009, and published as WO 2010/041018 on Apr. 15, 2010, which claims the benefit of and priority to United Kingdom Patent Application No. 0818401.2, filed Oct. 8, 2008, the entire contents of each of the foregoing are incorporated herein by reference.

The present invention relates to a fastener feed method and apparatus and in particular to improved aspects of fastener feed and delivery to and around fastener insertion apparatus.

The term "fastener" is used herein to include rivets, screws, slugs, inserts and other types of fastening devices.

It is well known in the field of riveting, and in particular self-piercing riveting, to feed rivets to a rivet setting tool via a delivery tube along which the rivets are propelled by, for example, blasts of compressed air. At the end of the delivery tube the rivet is typically transferred to a rivet delivery passage in a nose of the setting tool. Once the rivet has been delivered into the passage a punch descends along the rivet delivery passage and drives the rivet out of the nose and into the material to be joined. The force applied to the rivet is such that it pierces the top layer of material and is deformed by an upsetting die disposed below the material to provide a joint. The rivet deforms in such a manner that it does not penetrate through the material to the underside of the die.

Modern mechanical joining tools such as, for example, rivet setters are generally microprocessor controlled and often combined with robot technology. The setter tools are operated under the control of a software program that provides instructions relating to the joining position and type (including fastener type and process parameters) for each joint to be effected in a particular workpiece. The type of fastening to be used is selected according to many factors including the size of the parts to be connected and the material from which they are made. In a continuous production environment, conventional self-piercing rivet setter tools are generally dedicated to a single rivet size and the problem of riveting combinations of different thicknesses and types of material that cannot be accommodated by a single rivet size is addressed by using several dedicated tools each applying a different rivet size. Obviously this requires careful planning and control as increased combinations of different joint thicknesses, types and strengths require additional rivet sizes and/or different insertion processes and therefore increased numbers of tools. Certain known fastening tools have dual feeds and are able to supply more than one type of fastener.

U.S. Pat. No. 5,465,868 describes a rivet feeding system in which there is a mobile buffer magazine, in the form of a bundle of tubes, connected between a plurality of remote bulk rivet sources and a rivet setter that is movable by a robot handler. Each buffer magazine is mounted at or near the rivet setter and is designed to contain the entire inventory of rivets for a given riveting operation. The bulk rivet source is floor-mounted remotely from the buffer magazine and comprises a plurality of rivet orientation devices such as vibratory feed bowls that deliver rivets to an inlet of the buffer magazine via delivery tubes. The bulk source of rivets is permanently connected to the buffer inlet by the tubes and the system operates by keeping the rivet level in the buffer magazine above a minimum so that the rivet setter is able to satisfy demand. The level of rivets in a tube of the magazine is detected directly by a sensor or indirectly by counting the rivets delivered to the tube. Tubes of a given bundle are filled with different rivet types/sizes. The path taken by a given rivet is determined by various selector devices that are operated by a programmable controller. A first selector device directs a rivet released from the source to a chosen buffer magazine, each magazine has a second selector device at inlet to select the tube into which the rivet is loaded and a third selector device at is outlet to select the desired rivet from the appropriate tube and direct it to the setter. The buffer magazine refilling cycle is carried out whilst the rivet setter is in operation.

A significant problem with the above-described system is that the range of movement of the robotic manipulator that carries the rivet setting tool is limited as the latter remains in permanent connection with the rivet supply. Delivery tubes are delicate and susceptible to kinking and entrapment or entanglement with other fixtures when the tool is manipulated (manually or automatically) in all three axes of movement. The inner profile of the tubes can be distorted to an extent that rivets become trapped in constrictions in the tube. Moreover, the connection of the tube to the setting tool can restrict tool access to the workpiece and provides for a bulky arrangement in that the tube must move up and down with the stroke of the nose of the setting tool during insertion of a rivet into a workpiece. Furthermore either a large number of sensors are required to detect the level of rivets in each magazine tube or the system controller must keep track of both the number of rivets withdrawn and those delivered so that the rivet level in each tube can be reliably supervised.

Generally, a common problem with existing rivet feed systems of the kinds described above is that the control system relies on keeping an inventory of rivets and their respective positions around the system. For example, the control system counts the rivets either as they leave the bulk source or as they enter the buffer magazines and again as they are demanded by the setting tool or as they leave the magazine, so that the quantity of rivets in the magazine can be determined at any point in the cycle and a decision can be taken whether or not to refill the buffer. If the riveting cycle is interrupted at any point as a result of a fault such as a jam, operator intervention is generally required and this often involves moving rivets from the positions last tracked by the control system. Moreover, occasionally more or fewer rivets are used in a particular riveting cycle than expected. The information regarding rivet quantities and locations stored in the memory of the control system is thus not always accurate. This can lead to the risk of the control system attempting to load too many rivets into the magazine on the tool side either by attempting to load an unknown quantity into the buffer or loading rivets into the buffer on top of an unknown quantity present in the buffer. Overfilling of the magazine can cause mechanical problems. In instances where too few rivets are loaded this can lead to an unplanned interruption of the production process and the need for manual intervention to correct the shortage which in itself may cause further problems in resetting the system such that it can recover to a controlled state of automatic operation once again.

In circumstances in which excess rivets are supplied to a storage magazine anywhere in the feed system the rivets may back up in the delivery tube upstream of the magazine. This can cause wear and damage to the delivery tube, which is generally made of a flexible plastics material Our European Patent Application No. 06765176.0 describes a fastener delivery system in which a buffer magazine of fasteners is situated at the tool without restricting the movement of the setting tool. The buffer magazine is permanently attached to the setting tool and re-loadable by docking with a stand to which fasteners are delivered from a bulk source. The magazine provides for a buffer of fasteners that allows the fastener-setting tool to perform a cycle of riveting processes without awaiting connection of a delivery tube and delivery of a fastener. Periodically, between work cycles, the buffer magazine can be refilled by docking with the stand and effecting transfer of fasteners from the appropriate bulk source. The fasteners are propelled along the delivery tubes by a source of pressurised gas or air at the source end. Rather than attempt to track each fastener around the delivery system by employing multiple sensors or counting the passage of fasteners at appropriate locations, fasteners are transferred independently to the stand side and then across to the buffer magazine on the tool side whilst the tool is docked with the stand. The buffer is deliberately over-filled and a probe associated with the buffer magazine holds a predetermined fastener in the buffer so that all preceding fasteners are retained in the buffer but all subsequent fasteners fall back into the stand side under the influence of gravity or otherwise.

The above process works well, but in some circumstances it is possible for a fastener falling back into the stand side occasionally to catch on an edge defined at the docking interface. In such an event the fastener can be released by introduction of an air blast but it is desirable to reduce the potential for such an occurrence.

It is a continual requirement in the industry to improve the efficiency and reliability of the delivery of individual rivets or other fasteners from the bulk source to a setting tool.

It is one object of the present invention, amongst others, to provide for an improved fastener feed apparatus that operates with increased reliability.

It is another object of the present invention to obviate or mitigate the aforesaid or other disadvantages.

According to a first aspect of the present invention there is provided a method for the automatic feeding of fasteners to fastener insertion apparatus, the apparatus comprising a fastener insertion tool and configured to insert X fasteners in an insertion cycle, a buffer for the temporary storage of fasteners in a track defined by the buffer, the buffer having an inlet, and a delivery track for transporting fasteners from the buffer towards a fastener delivery passage of the tool, the insertion apparatus being movable between an operative position where it is able to insert fasteners via the delivery passage in the tool into a workpiece and a refilling position where it is docked at a docking station so as to permit the buffer to be loaded with fasteners from a storage track of the docking station, the storage track being connected to a source of fasteners, the method comprising:

(a) executing a start-up routine to ensure the docking station storage track is initially filled with sufficient fasteners for an insertion cycle to be performed;

(b) moving the insertion apparatus to the refilling position and transferring fasteners from the storage track into the buffer via the inlet;

(c) filling the docking station storage track with fewer than X fasteners, moving the insertion apparatus to the operative position, and inserting X fasteners;

(d) moving the insertion apparatus to the refilling position and transferring the fasteners in the storage track into the buffer via the inlet;

(e) detecting whether the buffer contains at least a predetermined quantity of fasteners, and if so repeating steps (c) and (d) until it does not;

(f) subsequently filling the docking station storage track with more than X fasteners and moving the insertion apparatus to the operative position and inserting X fasteners;

(g) detecting whether the buffer contains at least a predetermined quantity of fasteners, and if not repeating step (f) until it does;

(h) subsequently filling the docking station storage track with X fasteners, moving the insertion apparatus to the operative position, inserting X fasteners, then moving the insertion apparatus to the refilling position and transferring the fasteners in the store at the docking station into the buffer via the inlet.

Step (h) may be repeated a predetermined number of times or it may simply be repeated until production ceases, is interrupted or otherwise disturbed. It is to be appreciated that there may be other steps executed between any of the above steps. For example, between step (g) and step (h) the docking station may be filled with more than X fasteners, the insertion apparatus moved to the operative position and X fasteners inserted, before step (h) is executed.

Once step (h) has been executed a steady state may be reached whereby it is repeated unless there is an unplanned interruption in the production process.

The number of fasteners, X, required for any given particular cycle will usually be known in advance for particular applications but may be different for different products and production facilities. The number of fasteners may occasionally be changed for a given product for instance following a temporary or permanent design change or a change in the manufacturing process. The particular value of X arising from the production situation and the configuration in which the apparatus is operated may be communicated automatically or manually to the control system. Typically, for an automated production line where vehicles or mass produced products are manufactured the value for X may lie between 10 and 50.

The different parts of the method (a) to (h) need not be executed in the order as set out; the sequence may be varied to achieve the same effect.

In the start-up routine, which may for instance take place at the start of each production shift, the number of fasteners in the buffer and the docking station storage may be known from the last cycle executed. The docking station storage track may be filled such that the number of fasteners in the storage track and the buffer combined is enough to complete an insertion cycle of X fasteners. Otherwise, the fasteners in the buffer may be emptied in a purge operation and the storage track at the docking station filled with X or more fasteners. The storage track may be filled to its capacity, which may be more than X.

The buffer may take any suitable form for the temporary storage of fasteners, including, for example a magazine defining an enclosed housing or simply an open track. Similarly it will be appreciated that the storage track may take any suitable form including, for example, an enclosed housing such as a magazine which may be of metal, an open or closed track which may simply be any suitable part of a length of delivery tube or track used to supply fasteners from the source of fasteners.

In step (c) the storage track may be filled with X−1 fasteners and in step (f) the storage track may be filled with X+1 fasteners.

The step or steps of detecting whether the buffer contains a predetermined quantity of fasteners may be performed using a device for determining whether a fastener is present at a pre-determined location in the buffer. The device may be any suitable kind of proximity sensor for detecting the presence of the fastener. It may take the form of a probe disposed proximate the pre-determined location in the buffer. The probe may be movable from a retracted position where it is clear of the track defined by the buffer to an extended position wherein extends into the track through a port in the buffer to detect whether or not a fastener is present in the track at the predetermined location.

The fasteners may be of any kind. In one particular embodiment they have a head and a shank. Such fasteners may be loaded into the buffer such the longitudinal axes of the shanks are substantially perpendicular to the longitudinal axis of the buffer.

The method may allow for fasteners to be loaded into the buffer in excess of a predetermined quantity in which case they may be expelled back to the storage track of the docking station, after the detecting steps, and whilst the insertion apparatus is still in the refilling position.

Any suitable means is used to transport fasteners around the feed apparatus. In one example gas pressure is used to blow the fasteners so as to transfer them from the docking station to the buffer. The gas pressure may be supplied from a port at the docking station or may be supplied from an alternative source.

The fasteners may be escaped from an end of the buffer opposite the end at which it is loaded and feeding them to the tool.

The quantity of fasteners being delivered into the storage track may be automatically detected and/or counted as the fasteners are discharged from the source of fasteners or as they travel past certain points between the source and the storage track. This may be achieved by using a sensor such as a proximity sensor that generates an electrical signal when a fastener is sensed and transmits the signal to a controller.

The storage track may be disposed in a substantially upright position.

The presence of fasteners may be detected and counted as they leave an escapement mechanism downstream of the source of fasteners.

The fasteners in the buffer may be purged before or at the same time as step (a) is executed. That is they are expelled from the buffer and from the feed apparatus.

After step (i) is repeated the predetermined number of times, steps (c) to (i) may be repeated.

The storage track of the docking station may, or may not, be filled to a capacity Z during step (a).

In the step of detecting whether the buffer contains a predetermined quantity of fasteners, the predetermined quantity is less than the capacity of the buffer.

After the insertion apparatus is docked a transfer gate at an interface between an inlet of the buffer and the docking station may be opened and said transfer gate is preferably closed before undocking the insertion apparatus.

According to a further aspect of the present invention there is provided a method for manufacturing a joint including feeding fasteners to a fastener insertion tool in accordance with the method of any preceding claim.

The method(s) may be carried out by an appropriately programmed processor. The invention therefore further provides for a computer program comprising computer readable instructions arranged to cause a processor to carry out a method defined above and a carrier medium carrying such a computer program.

A further aspect of the invention provides for apparatus for automatic feeding of fasteners to fastener insertion apparatus, the apparatus comprising: a memory storing processor readable instructions; and a processor arranged to read and execute instructions stored in said memory; wherein the processor readable instructions comprise instructions configured to cause the processor to carry out the method defined above.

The apparatus may further comprises: a fastener insertion tool; a buffer for the temporary storage of fasteners in a track defined by the buffer, the buffer having a delivery track for transporting fasteners from the buffer towards a fastener delivery passage of the tool, the insertion apparatus being movable between an operative position where it is able to insert fasteners via the delivery passage in the tool into a workpiece and a refilling position where it is docked at a docking station so as to permit the buffer to be loaded with fasteners from a storage track at the docking station.

Specific embodiments of the present invention will now be described, by way of example only, with reference to the accompanying drawings in which:

FIGS. 2A-2E show plan views of an escapement mechanism forming part of the apparatus of FIG. 1;

Figure 1:
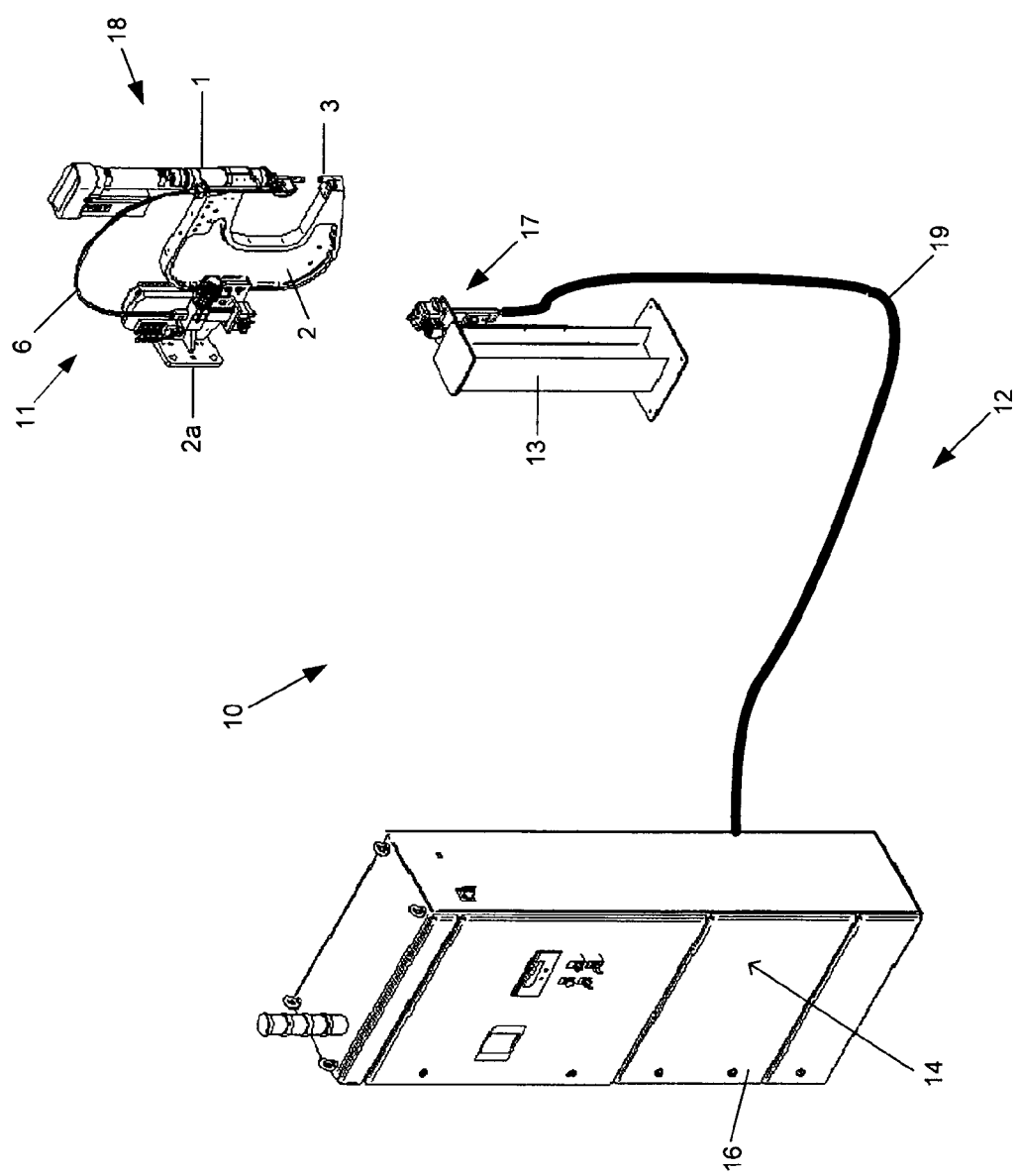
FIG. 1 is a perspective view of fastener feed and insertion apparatus in accordance with the present invention.
Figure 3:
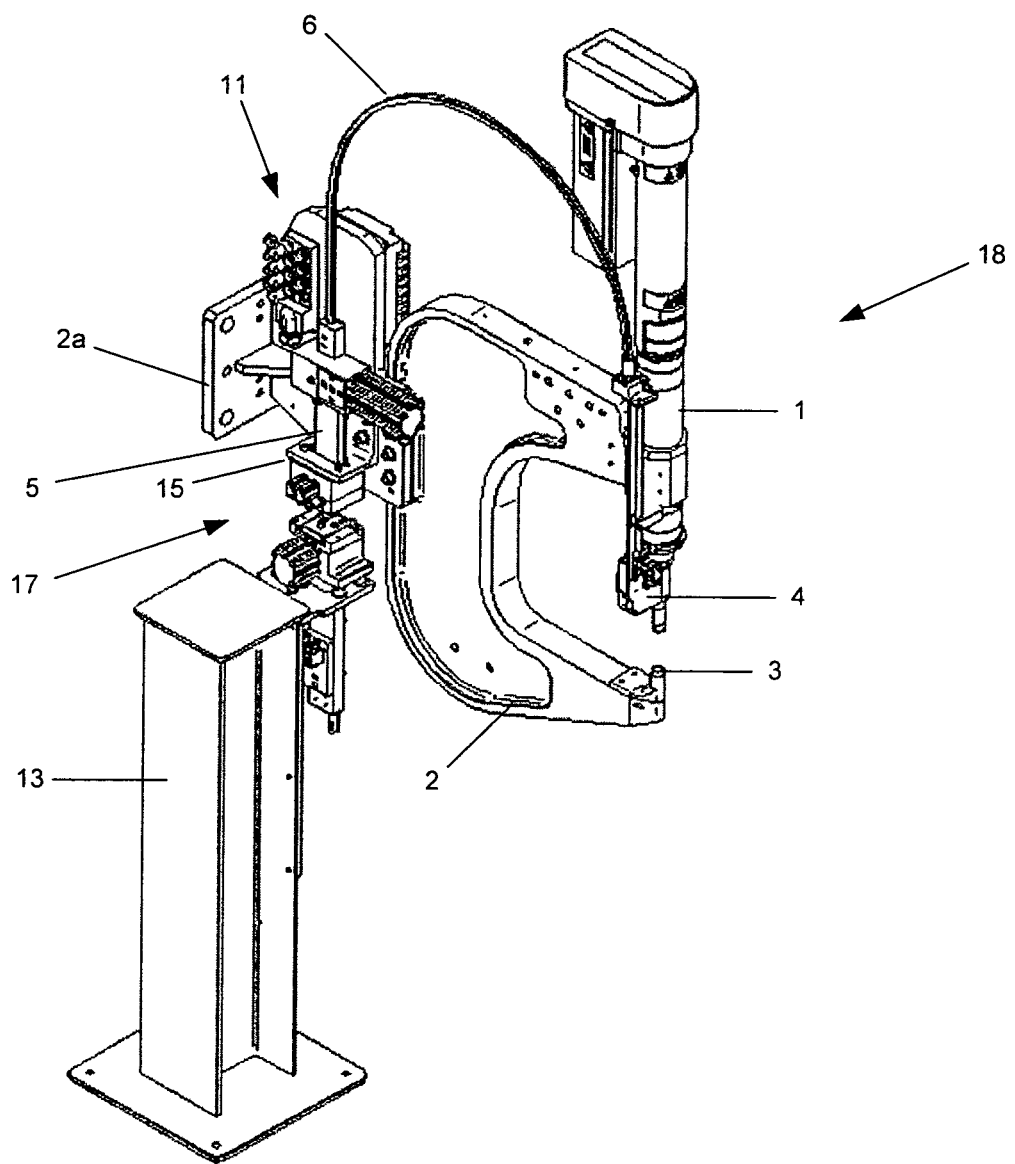
FIG. 3 is a perspective view showing the fastener insertion apparatus of FIG. 1 docking with a docking stand of the feed apparatus.

Referring now to FIGS. 1 and 3 of the drawings, the exemplary fastener feed apparatus, generally designated by reference numeral 10, is shown in relation to a rivet setting tool 1 mounted on an upper jaw of conventional C-frame 2 above a rivet-upsetting die 3 disposed on the lower jaw. Rivets (not shown in FIG. 1) are inserted by the tool into a workpiece (not shown) supported over the die 3 as is well known in the art. It is to be appreciated that whilst the specific embodiment described herein relates to the feeding and insertion of rivets it has application to other fasteners.

The C-frame is mounted on a robot manipulator (not shown) via a mounting bracket 2a such that it is movable with the tool 1 by the robot towards and away from the workpiece as required. The feed apparatus 10 comprises two principal sections 11, 12 that are releasably connectible together at a stationary floor-mounted docking stand 13 intermediate the tool 1 and a bulk source 14 of rivets. A first section 11, downstream of the docking stand 13, is carried on the C-frame 2 with the tool 1 and transports rivets from a tool-side docking interface 15 to a nose 4 of the tool 1 for insertion into the workpiece. A second section 12, which is principally upstream of the docking stand 13, is connected between the bulk source 14 of rivets stored in a cabinet 16 and a stand-side docking interface 17 supported on the docking stand 13. The two sections 11, 12 are releasably connectable at the docking stand 13 by bringing the docking interfaces 15, 17 into register. For convenience the apparatus that is upstream of the stand including, in particular, the setting tool 1, C-frame 2 and first section 11 of the feed apparatus 10, is collectively referred to herein as rivet insertion apparatus 18. As is known, the cabinet 16 not only houses the bulk source of rivets (e.g. vibratory bowls with rivet orientation mechanisms) but also the compressed gas (e.g. air) delivery systems required to propel rivets in the feed apparatus. It may house a programmable controller in the form of microprocessor-based hardware and operational software for controlling the operation of the feed apparatus and the rivet insertion apparatus, although this may be housed separately and connected by suitable cabling or other communication means to the cabinet. Such gas delivery and control systems are well known and will not therefore be described in detail herein.

The rivet insertion apparatus 18 is designed to dock with the docking stand 13 at predetermined intervals in the riveting operation to collect rivets for the next riveting cycle, such rivets being temporarily stored in a buffer magazine 5 that is integral with the first section 11 of the feed apparatus 10. The docking operation brings together the tool-side and stand-side docking interfaces 15, 17 of the rivet feed apparatus 10 and allows rivets to flow from the bulk sources 14 across the interfaces to the nose 4 of the setting tool 1 in a particular manner as described herein.

A buffer magazine 5 is connected between the tool-side docking interface 15 in the first section 11 of the rivet feed apparatus 10 and the inlet of a delivery tube 6 that is connected to the setting tool 1. Rivets are transported to the nose 4 of the tool 1 in the delivery tube 6 thereby allowing the tool 1 to perform a cycle of riveting processes without waiting for the connection of the delivery tube 6, delivery of the rivet and disconnection of the tube. Periodically, between work cycles, the buffer magazine 5 can be refilled by docking the rivet insertion apparatus 18 at the docking stand 13.

On the docking stand side a delivery tube 19 is connected between the bulk source 14 and the docking interface 17. Although not shown in the embodiment of figure, there may be more than one delivery tube 19 so as to allow different rivet types to be fed in parallel to the docking interface 17 and therefore into a plurality of separate rivet setting tools 1 operating in parallel. An escapement device is associated with each delivery tube 19 and serves to release oriented rivets from the bulk source selectively into the delivery tube 19. The device is typically housed in or proximate to the cabinet and is not shown in FIG. 1 as it is hidden from view but is shown in FIGS. 2A-2E.

The escapement mechanism 200 comprises a housing 201 penetrated by first and second track portions 202, 203 along which rivets 60 can travel. As is conventional, the tracks are of a generally T-shaped cross section that supports a rivet as it travels along the track under the force of a propelling gas such as, for example, compressed air. The first and second track portions 202, 203 have longitudinal axes that occupy the same general plane but are laterally offset and interrupted by a transverse passage 204 in which a transfer gate 205 is slidable. An opening 206 in the transfer gate 205, having the same cross section as the track, is designed to receive a rivet and selectively is brought into register with the first or second track portion 202, 203 by movement of the gate 205. A two-position pneumatic actuator 207 is connected to the side of the housing 201 and operates the gate 205 in response to a signal from a controller.

The rivets 60 are delivered to the escapement mechanism 200 from the bulk source 14 and arrive at an inlet track 208 that is connected to the housing 201 such that it is aligned with the first track portion 202. Similarly, rivets that exit the escapement mechanism 200 are delivered into delivery tube 19 via an outlet track 209 that is connected to the housing 201 such that it is aligned with the second track portion 203. A suitable connecting interface arrangement is provided for connecting the outlet track 209 to the delivery tube 19 as is shown, In the particular embodiment illustrated in FIGS. 2A-2E, the outlet track 209 has an arcuate bend for changing the direction of travel of the rivets before they enter the delivery tube 19. A ring sensor 210, which may be any suitable form of proximity sensor, is positioned around an upstream part of the delivery tube 19 and senses the presence of a rivet 60 as it passes along the tube 19. Each time a rivet is sensed an electrical pulse is generated and transmitted to the controller so that a count can be maintained of the escaped rivets.

Once the rivet 60 has been moved by the transfer gate 205 into alignment with the second track portion 203, it is free to exit under a blast of compressed air or other gas is applied to it via a gas passage 211 in the housing 201 in order to propel it onwards. The passage 211 is connected to a suitable source of gas (not shown) via a connecting conduit 212 extending from a side wall of the housing 201. Alternatively, it may be arranged to exit under the influence of gravity, depending on the orientation of the apparatus.

Figure 2A:
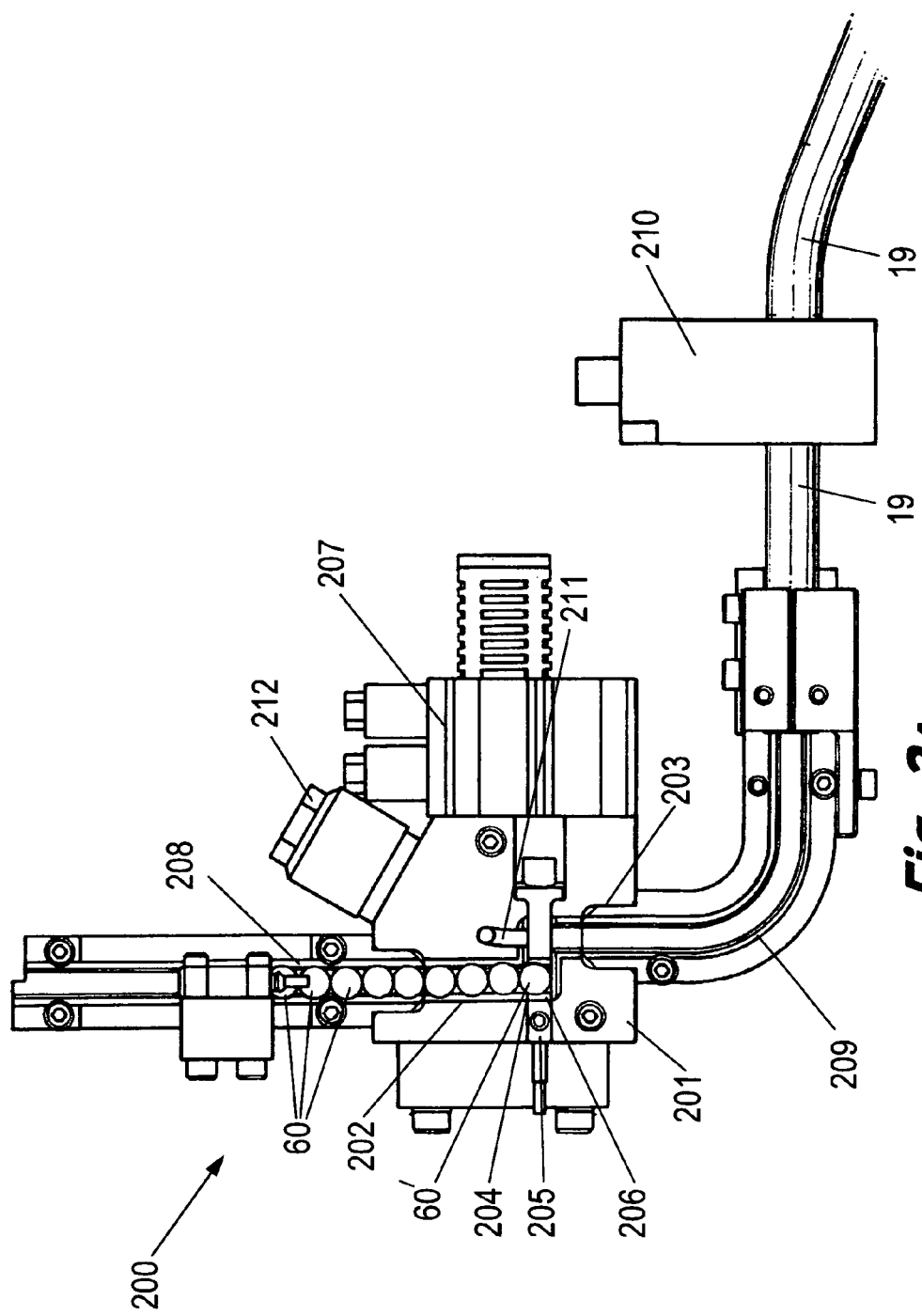

FIG. 2A to 2E show in sequence the operation of the escapement device in supplying a single rivet 60' to the delivery tube 19. In FIG. 2A it can be seen that multiple rivets 60 have been delivered from the bulk source 14 to the inlet track 208 of the mechanism 200. The gate 205 occupies a first position in which the opening 206 is aligned with the first track portion 202 and a leading one of the rivets 60' occupies the opening 206 with the immediately adjacent, upstream rivets occupying the first track portion 202 in the housing. When it is desired to release the rivet 60' to the delivery tube 19 the transfer gate is operated to move to its second position in which it is brought into register with the second track portion 203 as shown in FIG. 2B. The blast of compressed air is then applied via the gas passage 211 to move the rivet 60' out of the gate 205 through the second track portion 203 and into the outlet track 209 (see FIG. 2C). The gate 205 is then moved towards the first position (see FIG. 2D) where it is ready to receive the next rivet (see FIG. 2E). As mentioned above the rivet may be moved out of the gate under the influence of gravity if the apparatus is oriented appropriately.

The escaped rivets are fed to the stand-side docking interface 17 in the delivery tubes 19 by a pressurised gas or air delivery system. The escaped rivets may be fed singly or in groups. Two or more rivets with the same or different characteristics may be provided by the same or additional bulk sources 14 fed simultaneously or at different times along two or more delivery tubes to a common docking arrangement, although this is not shown in the figures. In this case the tool-side buffer magazine 5 may contain storage for two or more rivet types. The additional delivery tubes may provide the same type of rivets to multiple rivet setting tools or different rivet types/sizes to multiple rivet setting tools or may simply be regarded as auxiliary delivery tubes should the main tube become blocked during a riveting operation. The docking interface arrangement is designed to allow rivets to be transferred reliably from the stand-side to the tool-side buffer magazine 5 so that the rivet insertion apparatus 18 has enough rivets to perform a given rivet cycle.

Figures 4A, 4B, 4C:
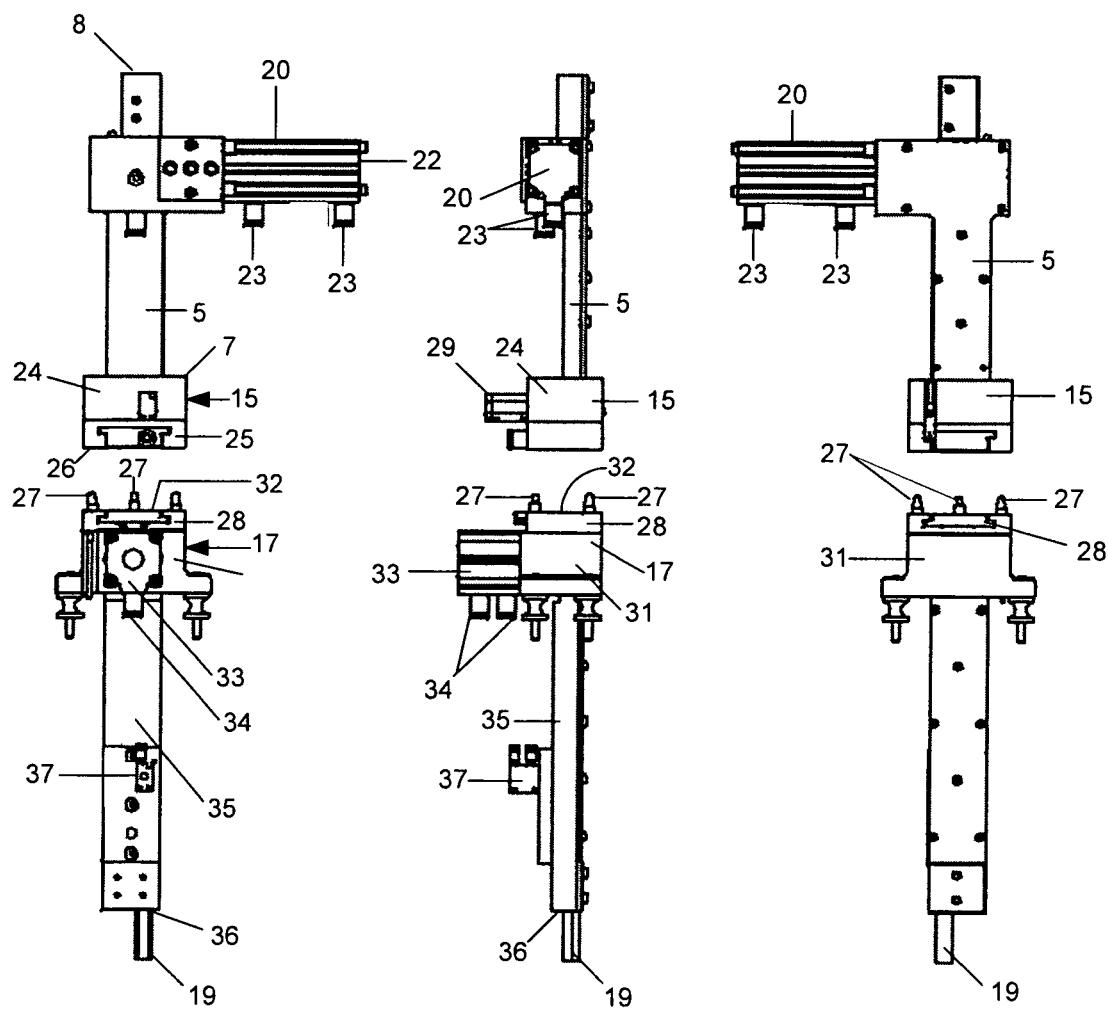
FIGS. 4A to 4C are front, side and rear views of a docking interface of the fastener feed apparatus.

Turning now to FIG. 4, the tool-side and stand-side docking interfaces 15 and 17 are shown separated but aligned in all the views A, B and C and are depicted together with neighbouring parts. The tool-side docking interface 15 is integrally connected to an inlet end 7 of the buffer magazine 5 whereas the opposite end of the magazine 5 has an outlet 8 that is designed to receive an end of the delivery tube 6. The interior of the buffer magazine 5 defines a track along which rivets can be stored in single file. At the outlet 8 an externally mounted pneumatic actuator 20 serves to operate an escapement gate 21 that is used to transfer rivets individually into the delivery tube 6. The housing 22 for the actuator has air supply connectors depicted at 23.

The tool-side docking interface 15 comprises a housing 24 having a sliding transfer gate 25 supported on its lowermost surface, the gate 25 defining a docking face 26, a rivet inlet (hidden) and alignment bores (hidden) for receipt of corresponding alignment pins 27 defined on the stand-side docking interface transfer gate 28. The side wall of the housing 24 supports an actuator 29 for an internal probe 30 (hidden in FIG. 2), the purpose of which will be discussed below. Both the buffer magazine 5 and interface 15 are formed from a rigid, hardwearing material such as hardened steel.

The stand-side interface 17 comprises a housing 31 that supports, on its upper surface, a sliding transfer gate 28 that defines a docking face 32 for abutment with the corresponding docking face 26 on the tool-side interface 15. The gate 28 has a rivet outlet (hidden) and the upstanding alignment pins 27 for receipt in the alignment bores of the tool-side interface 15. A pneumatic actuator 33 for operating the transfer gates 25, 28 is mounted on the side wall of the interface housing 31 and its operation is described below. Reference numerals 34 designate the air supply and return connectors for the actuator.

In an alternative embodiment the stand side interface housing 31 may simply be connected to the delivery tube 19 which serves as storage for the rivets on the stand-side of the interface. The rivets may be stored at any appropriate location along the delivery tube. In such an arrangement the aforementioned probes and actuators may be omitted and the quantity of fasteners stored in the track determined by a suitable sensor such as a ring sensor disposed around the tube or a sensor in the escapement mechanism 200. The delivery tube (or other form of storage track) may be curved to allow fasteners to be held against the effects of gravity at the lowermost portion of the curve.

The stand-side docking interface housing 31 is integrally formed with a rigid magazine 35 that defines an internal rivet track, extends downwardly from the interface and terminates in an inlet 36 that is designed to receive an end of delivery tube 19. An actuator 37 for an internal probe is externally mounted on the magazine 35 intermediate the inlet 36 and the interface housing 31. The magazine 35 and the interface housing 31 are again manufactured from a rigid material such as hardened steel.

The delivery tubes 6, 19 and magazines 5, 35 all have an internal track with a T-shaped profile conforming to the outline of the rivets being fed. The tracks are designed to receive rivets such that they can be blown therealong by the compressed air individually or in groups in single file, with the head of the rivet being supported on a shoulder in the track defined by the transition between the shank and head of the T-shape. Examples of such delivery tubes are described in our European patent No. 1102650, the content of which is incorporated herein by reference.

Figure 5:
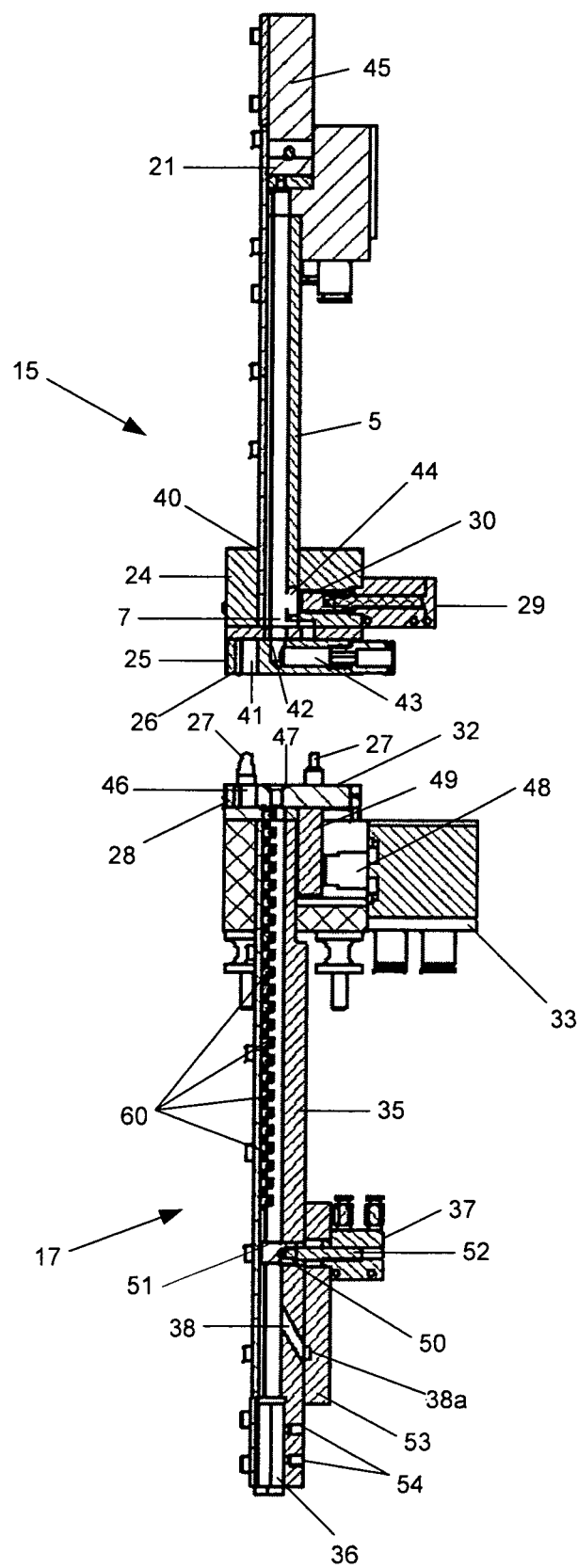
FIGS. 5 to 12 are sectioned side views of the docking interface of FIGS. 4A to 4C, some being enlarged views, illustrating the steps in transferring rivets from the stand-side interface to the tool-side interface.
Figure 6:
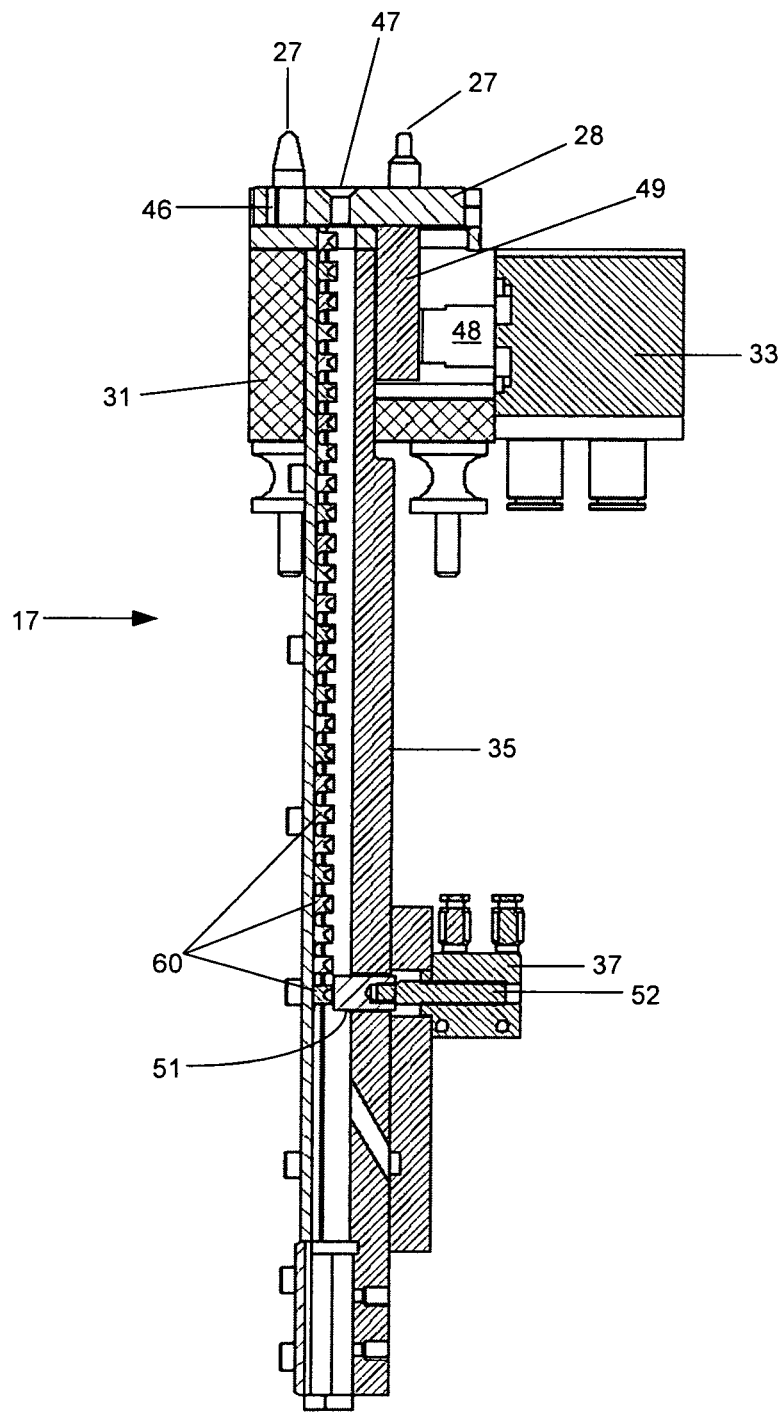
Figure 7:
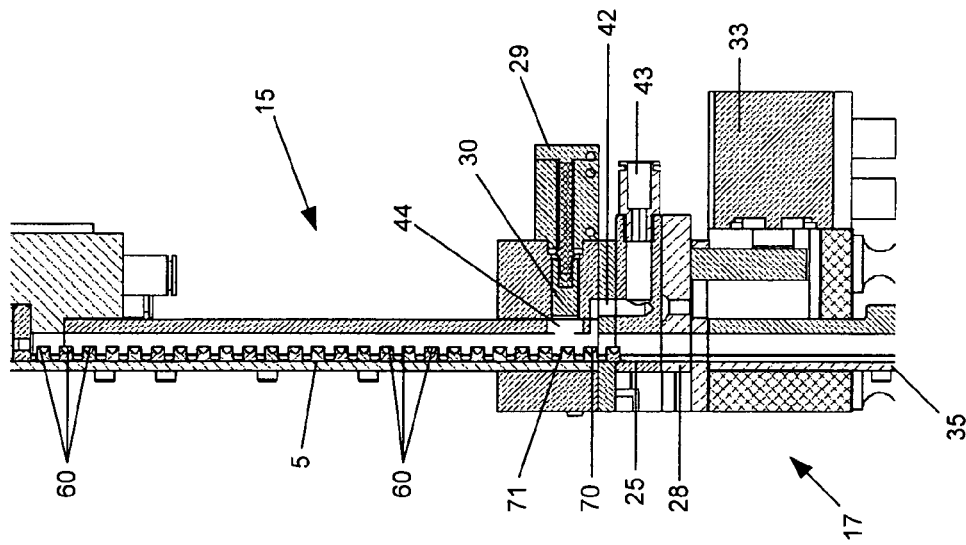

Referring now to FIG. 5, the interface housing 24 on the tool side has an aperture 40 into which the buffer magazine 5 is received. The inlet 7 of the magazine 5 is closable by the transfer gate 25 that is shown in more detail in this figure and comprises a thin plate penetrated by a T-shaped rivet aperture 41 extending between top and bottom surfaces. The gate 25 is slidable in a direction transverse to the axis of the aperture 41 (and buffer magazine 5) by the gate actuator 33 (FIG. 4) mounted on the stand-side. In addition to the rivet aperture 41, the gate 25 may optionally have a parallel blind bore 42 that is open to the top surface of the plate. A transverse air passage 43 extends along the gate 25, opens into the bore 42 and provides communication between the blind bore and a compressed air supply (not shown). The transfer gate 25 is slidable between a closed position (as shown in FIG. 7) where the rivet aperture 41 is out of register with the track in the buffer magazine 5 and an open position (see FIG. 8) where it is in register to allow the passage of rivets. Immediately above the transfer gate 25, the buffer magazine 5 has a side port 44 that is aligned with the probe 30 mounted on the side of the interface housing 24. The probe 30 is shown in detail in FIG. 5 and comprises a member that is slidable by the actuator 29 (referred to above in relation to FIG. 4) between a first position where it extends through the side port 44 into the track of the buffer magazine 5 and a second retracted position as shown in FIG. 3 where it is clear of the track. The upper end of the buffer magazine 5 is received in a housing 45 for the escapement gate 21.

The transfer gate 28 on the stand-side interface is similar to that on the tool-side in that it is penetrated across its thinnest dimension by a rivet aperture 46 and is slidably mounted so as to move in a direction perpendicular to the central axis of the magazines 5, 35. The transfer gate 28 is shown in FIG. 3 in the closed position with the rivet aperture 46 out of register with the track of the magazine 35. Alongside the rivet aperture 46 there is an air vent 47 in the transfer gate 28 that is in alignment with the magazine 35 track. The transfer gate 28 is slidably operated by the pneumatic actuator 33 mounted externally on the magazine 35 and immediately below the plate. The actuator 33 is connected to the gate 28 by means of its rod 48 that is connected to a wall 49 that depends from the plate. When the two interfaces 15, 17 are docked the alignment pins 27 on the stand-side transfer gate 28 are received in the bores on the tool-side transfer gate 25 such that the two docking faces 26, 32 gates are brought into abutment and the gates 25, 28 are slidable in unison by the actuator 33 on the stand side. Towards the inlet end 36 of the stand-side magazine 35, there is a side port 50 for receipt of the stand-side probe. The probe is simply a slidable member 51 mounted on the end of a rod 52 of the actuator 37 that is movable between an extended position where it extends through the port 50 into the track and blocks the passage of rivets (as shown in FIG. 7) and a retracted position where it is clear of the track. It will be seen in FIG. 7 that a number of rivets 60 have been blown from the source 14 along delivery tube 19 and into the magazine 35. Immediately below the probe 51 there is an air blast passage 38 perforating the wall of the magazine 35 and extending in an upwardly inclined direction into the track. An inlet 38a to the passage 38 is defined in a mounting plate 53 for the probe actuator 37 and in the drawing of FIG. 7 extends into the page.

At the inlet end 36 of the stand-side magazine 35 there are two fixing apertures 54 for securing the delivery tube 19 (not shown in FIG. 5) that is received in the inlet 36.

The rivet feed operation will now be described with reference to FIGS. 1 to 13, the latter being a flowchart summarising the steps in the operation. In some of these figures the delivery tubes 6, 19 and the various actuators are not shown for clarity but the gates 25, 28 and probes 30, 51 are depicted. In FIGS. 1 and 3 the interfaces 15, 17 are shown separated, with the stand-side magazine 35 containing rivets 60 supplied from the bulk storage 14 via the escapement mechanism and delivery tube 19 and ready for transfer to the tool side.

The pneumatic actuators 20, 29, 33, 207 are all operable by the controller. It is to be appreciated that actuators need not necessarily be pneumatic but, for example, could be hydraulically or electrically operated. Similarly the application of the compressed air for propelling the rivets at different points in the feed apparatus is generated under the supervision of the controller.

Figure 13:
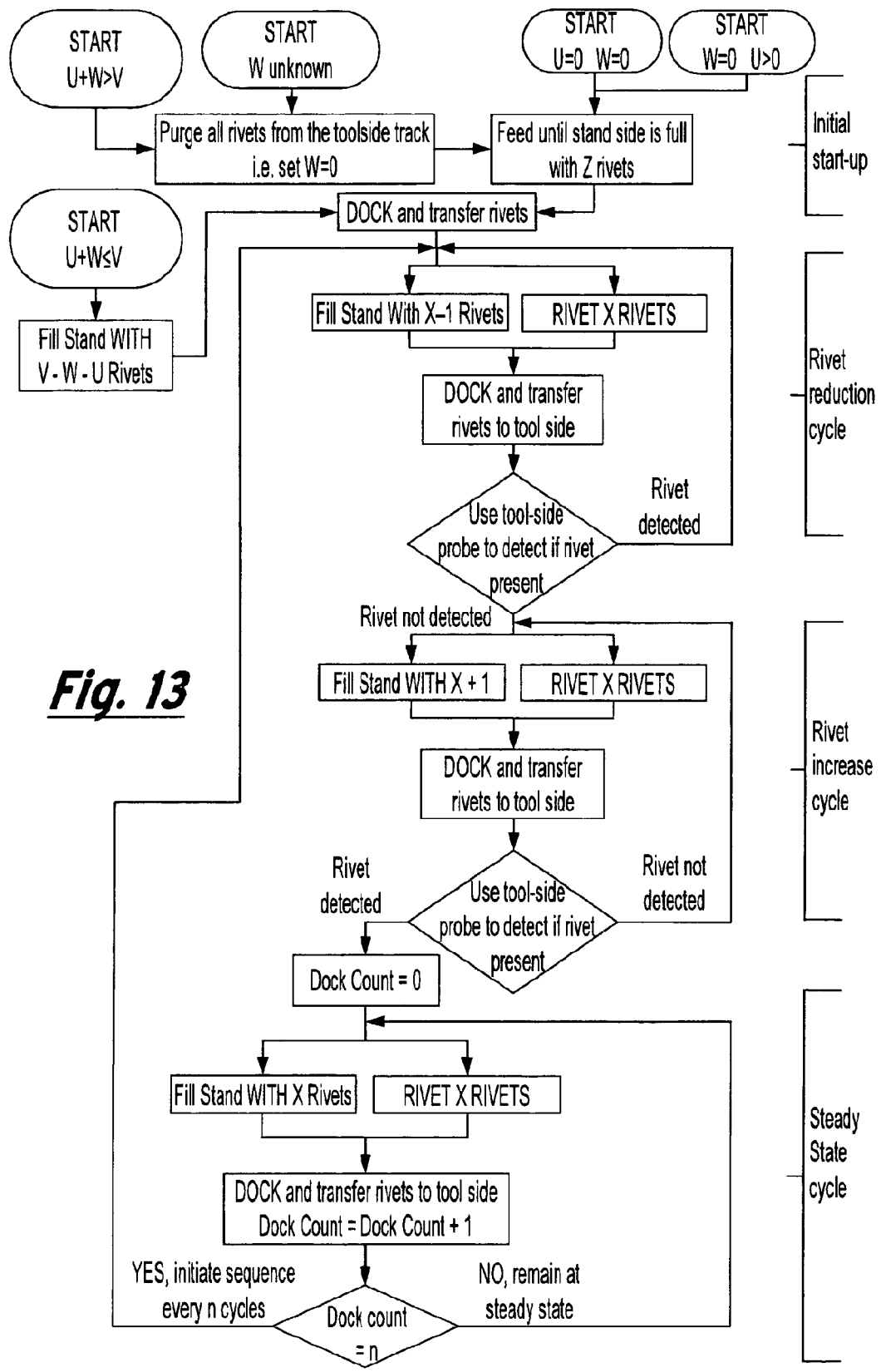
FIG. 13 is a flowchart illustrating the steps executed under the supervision of a controller in an exemplary method in accordance with the present invention.

The operation is described in relation to discrete riveting cycles in which X rivets are inserted into one or more workpieces. The number of rivets may be known as it is a consistent number for every cycle or it may be that it is programmed into, or otherwise delivered to, the controller. In the flowchart of FIG. 13 the following key is used:

V—the rivet capacity of the tool-side magazine track
Z—the rivet capacity of the stand-side magazine track
W—the number of rivets present in the tool-side magazine track
U—the number of rivets present in the stand-side magazine track The capacity V of the tool-side magazine track is designed to be greater than that of the stand-side capacity Z, which, in turn, is greater than the number of rivets, X, required for the cycle. The values of V and Z are pre-programmed into the controller.

As illustrated in FIG. 13, there are five potential starting points in the control sequence, the particular starting point being dependent on controller's knowledge of the number of rivets present on each side of the docking station. In some instances the controller will have a record of the number of rivets in both magazines 5, 35. In other instances the number will be unknown for one or both of the magazines 5, 35.

If the number of rivets 60 on each side is known and this exceeds the capacity V of the tool-side track, the rivets are purged from the tool-side magazine 5. This is achieved, for example, by allowing the rivets to fall out of the tool-side track into an appropriate repository when the tool-side track is undocked from the stand-side track, although other methods will be immediately apparent to the skilled reader. Once all rivets have been purged the stand-side magazine can be filled to capacity with Z rivets.

On the other hand, if the combined total number of rivets W+U does not exceed the capacity V of the tool-side magazine track, then the appropriate number of rivets V−(W+U) are delivered to the stand, the rivets being counted by the ring sensor 210 as they are released into the delivery tube 19.

In the event that the number of rivets in the tool-side buffer magazine 5 is unknown, the rivets are purged as described above. Once all rivets have been purged the stand-side magazine 35 can be filled to capacity with Z rivets.

If the both the magazines 5, 35 are empty or only the magazine 5 on the tool side is empty, the stand-side magazine 35 is filled to capacity Z.

In order to load the stand-side magazine 35, rivets 60 are released from the escapement mechanism 200 and blown by compressed air to the stand 13 as described above until the sensor 210 determines that the required number have been released. The rivets 60 may be transported individually or in groups and intermediate air boost supplies may be used if required at predetermined positions along the delivery tube 19. Whilst the air pressure is applied, the rivets 60 collect in the stand-side magazine 35 at the end of the delivery tube 19.

In one embodiment, at predetermined time intervals during the rivet feed process, the controller sends a signal to the actuator 37 for the probe 51 on the stand-side magazine 35 to move it to the extended position to identify whether a rivet is present at that position in the magazine (FIGS. 5 and 6) and therefore if the magazine is full. A typical filling sequence might be to blow a group of rivets, say five, from the source 14 to the stand magazine 35 and then advance the probe 51 to detect whether or not the magazine 35 is full. If the probe 51 extends all the way across the track to the opposite wall of the magazine 35 then the controller can deduce from the length of travel of the actuator rod 52 that the magazine is not full in which case the probe 51 is retracted and a further group of five rivets 60 are blown along the delivery tube 19 to the magazine 35. The process is repeated until the extension of the probe 51 (and therefore the travel of the rod 52 of the actuator 37) is limited by the presence of a rivet. In such an instance the tip of the probe 51 comes into contact with the underside of the rivet shank (FIG. 6) and the controller deduces that the magazine 35 is full operates to stop the fill sequence. Once a rivet 60 is detected by the probe 51 (FIG. 6) it remains in the partially extended position in contact with the shaft of the rivet to support the train of rivets in the magazine.

An alternative embodiment is described below in relation to FIGS. 14 to 16 in which the probe is not required to hold the rivets in position.

It is to be understood that the use of a probe is described purely by way of example; other methods for detecting the presence of a rivet at a particular location in the magazine may be used including, for example, one or more proximity transducers or one or more other sensors.

Once the controller determines that the requisite number of rivets has been loaded into the stand-side magazine 35, the rivet insertion apparatus can dock when there is a need to load the buffer magazine 5 with rivets. FIG. 7 shows the two docking interfaces 15, 17 when the rivet insertion apparatus 18 is docked with the stand 13. It will be seen that the transfer gates 25, 28 are engaged with docking faces 26, 32 in abutment and are in the closed position. The tool-side probe 30 is in the retracted position and the probe 51 for the stand-side magazine 35 is partially extended to support the train of rivets 60 that extends upwardly in the magazine 35.

Figure 8:
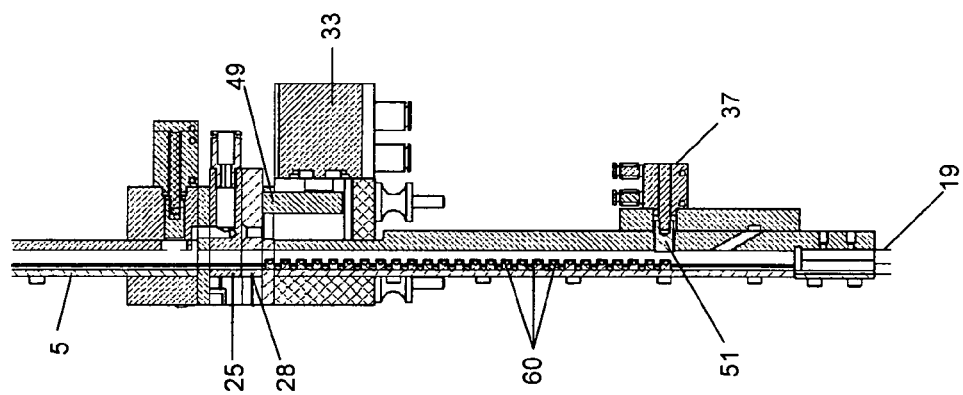
Figure 9:
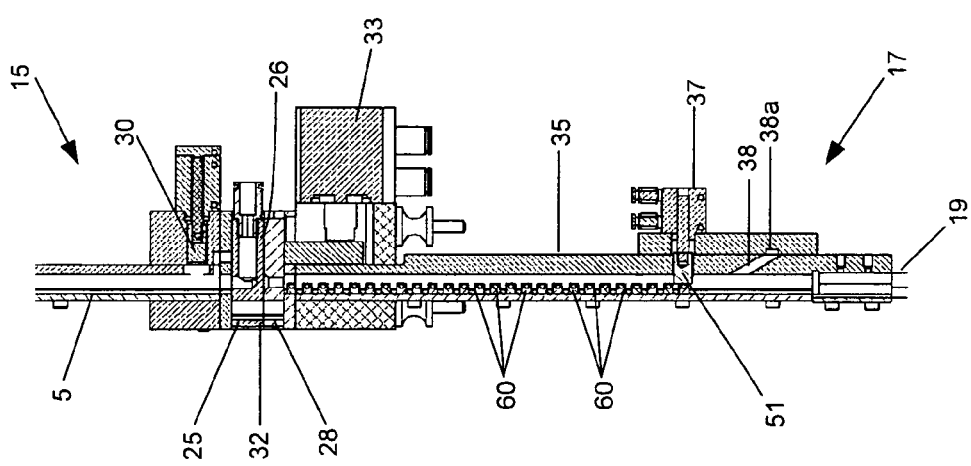
Figure 12:
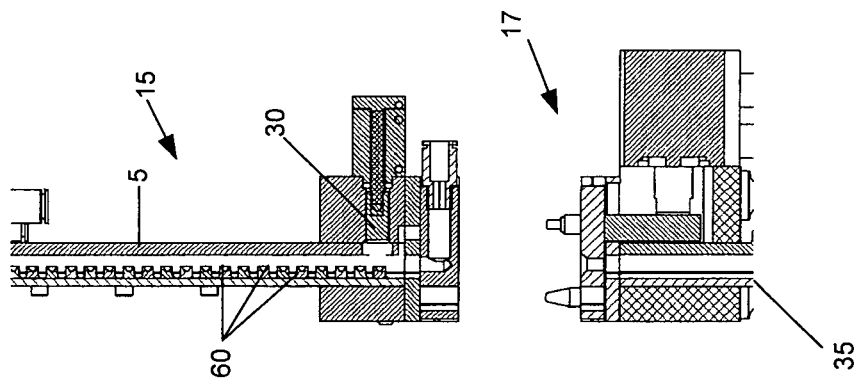
Figure 11:
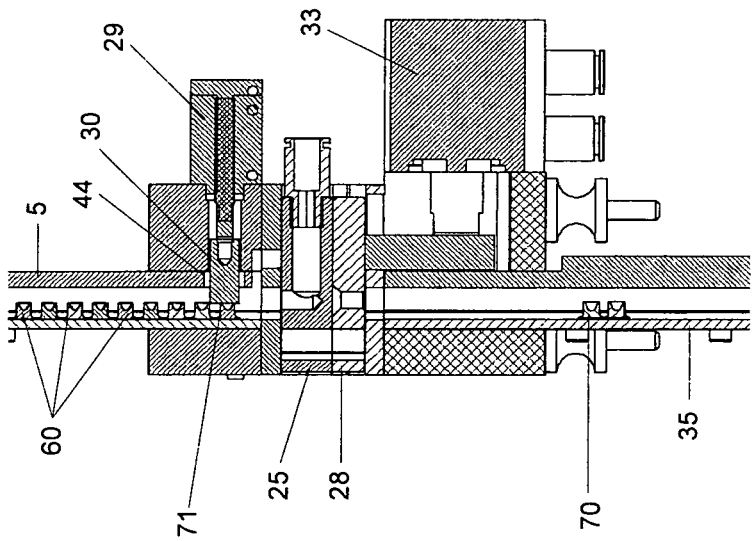

Once the insertion apparatus is docked the controller operates the air supply to apply a localised air pressure blast via the inlet 38a and passage 38 to urge the rivets upwardly in the magazine along the track. The probe 51 can then be retracted (see FIG. 8) whilst the rivets 60 are maintained in position by the air blast. The transfer gate actuator 33 is then operated to retract the wall 49 and therefore to move the gates 25, 28 to the open position (as shown in FIG. 8) so as to allow the rivets 60 in the magazine 35 or in the end of delivery tube 19 to be blown through the interfaces 15, 17 and into the tool-side buffer magazine 5 (FIG. 9). In this embodiment, the tool-side buffer is shown being over-filled and rivets in excess of the capacity of the buffer magazine are allowed to fall back across the interfaces 15, 17 to the stand-side. In another embodiment of the sequence the number of rivets blown across the interface is counted such that there is no scope for over-filling of the tool-side buffer magazine. This avoids rivets passing back over the interfaces 15, 17 and causing wear.

The transfer gate actuator 33 is then retracted to move the gates 25, 28, in unison, to the closed position (FIG. 11) and the rivet insertion apparatus 18 disconnects from the docking stand 13 (FIG. 12) so as to separate the docking interfaces 15 and 17. At this point in the cycle the tool-side probe 30 can be retracted to unclamp the rivet train 60 in the buffer magazine 5 and the rivets can be delivered to the nose 4 via the delivery tube 6 by the escapement mechanism 21 at the outlet 8 of the buffer magazine 5 in a known manner.

After the initial start-up phase is complete, the controller proceeds to execute a rivet filling sequence in which the number of rivets in the tool-side magazine 5 is effectively "tuned" to a desired amount for executing the riveting cycle, as illustrated in FIG. 13.

The process starts by the stand-side magazine 35 being loaded with X−1 rivets in parallel with the rivet insertion apparatus 18 using X rivets in a riveting cycle. The number of rivets being loaded into the stand-side magazine 35, is managed by the controller which receives from pulses from the sensor 210 and this keeps a count of those transferred to the stand-side magazine 35. Once the riveting cycle and the loading of the stand-side magazine 35 is complete the docking interfaces 15, 17 come together again and the rivets are transferred from the stand-side magazine track to the tool-side magazine track as described above. This "reduction" cycle serves to reduce the number of rivets in the tool-side buffer magazine after the docking and transfer sequence.

Figure 10:
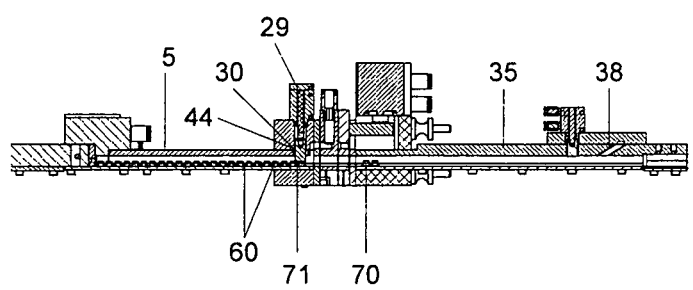

The tool-side probe 30 is then advanced by actuator 29 through the side port 44 to determine whether or not there is a rivet 60 present in the position immediately adjacent thereto. If a rivet 60 is present this means that the buffer magazine 5 has been filled with at least a known quantity W of rivets. The tool-side probe 30 remains in the partially extended position to hold the rivets in place (FIG. 10). This known quantity of rivets is less than the capacity V of the tool-side magazine track but greater than the capacity Z on the stand-side. The air supply from the passage 38 that propels the rivets across the interface is then turned off. As an alternative to the localised air blast it is to be understood that the air pressure may be supplied remotely from the stand i.e. at or near the bulk source. The stand-side filling and reduction cycle is then repeated as indicated in FIG. 13, whereby X rivets are expended in the riveting operation and X−1 rivets are loaded into the stand-side magazine 35.

If the probe 30 does not detect the presence of a rivet 60 then it can be deduced that the tool-side magazine 5 has fewer rivets than the desired quantity and the controller executes a cycle that increases the number of rivets being loaded to the stand-side whilst the next riveting operation is performed. More specifically, whilst the rivet insertion apparatus is using X rivets the stand-side magazine 35 is filled with X+1 rivets in a "rivet increase" cycle. The rivets 60 are transferred in a docking operation as before and the tool-side probe 30 checks for the presence of a rivet at the predetermined location again. If a rivet 60 is detected by the probe 30 then it can be deduced that the tool-side magazine 5 has sufficient rivets for a riveting cycle and a "steady-state" cycle can be initiated in which the stand-side magazine 35 is filled with X rivets at the same time as the rivet insertion apparatus 18 uses X rivets (see lower part of FIG. 13 flowchart). In this cycle a count is kept of the number of docks between the tool and stand interfaces 15, 17 and when this count reaches a predetermined number, n, the above described tuning cycle is repeated. This count is an optional feature of the invention. If a rivet is not detected by the probe then it can be determined that the tool-side magazine 5 is not full and the rivet increase cycle is repeated until the probe 30 fails to detect the presence of a rivet 60.

The above filling sequence ensures that a sufficient number of rivets are always present in the tool-side magazine 5 in order for the rivet insertion apparatus to complete successfully a riveting cycle, without the need for multiple sensors or sophisticated counting routines.

The filling sequence can be used in combination with the routine described in our European patent application No. 06765176.0 in which tool-side magazine 5 is over-filled and any excess rivets in the magazine 5 below the tool-side probe 30 to fall back into the stand-side magazine 35 and delivery tube 19 under gravity. An air blast may be applied through the passage 43 and bore 42 in the tool-side transfer gate 25 to assist in urging the excess rivets back to the stand side. It will be appreciated that the air blast egresses from the bore 42 and impacts upon the rivet 70 (see FIGS. 9 and 10) immediately below the rivet 71 that is held by the gate probe 30 so as to urge any excess rivets backwards. The filling sequence ensures that the number of excess rivets that are transferred back to the stand-side magazine is reduced until the number of rivets on the stand-side that are waiting to be transferred is equal to the number being consumed in each cycle so that there are no excess rivets to transfer across the docking station interface. If the riveting process is interrupted for any reason the controller ensures that the filling process resumes by over-filling to ensure that sufficient rivets are provided to the tool when it recommences the riveting process.

It will be appreciated that the two probes 30, 51 are housed within sealed areas so that compressed air does not escape through the side ports 44, 50 in the magazines 5, 35.

The present invention provides for a feed system that is tolerant of attempts to overfill the buffer magazine and so if an operator is unsure of the number of rivets at the rivet insertion apparatus the docking and rivet feed operation can be executed without risk of overfilling. It therefore obviates the requirement to conduct an audit of rivets present in the apparatus or to rely on potentially inaccurate memory counts in the controller. Moreover, it removes the possibility of the buffer magazine being under-filled. It also reduces the frequency of the occurrence of rivets falling back across the docking interface from the tool side to the stand side and therefore reduces the potential for rivets to become caught at the interface.

The use of tool-side probe 30 that is configured to hold a train of rivets 60 in the magazine 5 by engaging the shank of the last rivet in the train is advantageous in that it does not pass through or protrude into any of the sensitive surfaces of track defined by the head of the T-shape.

Figure 14:
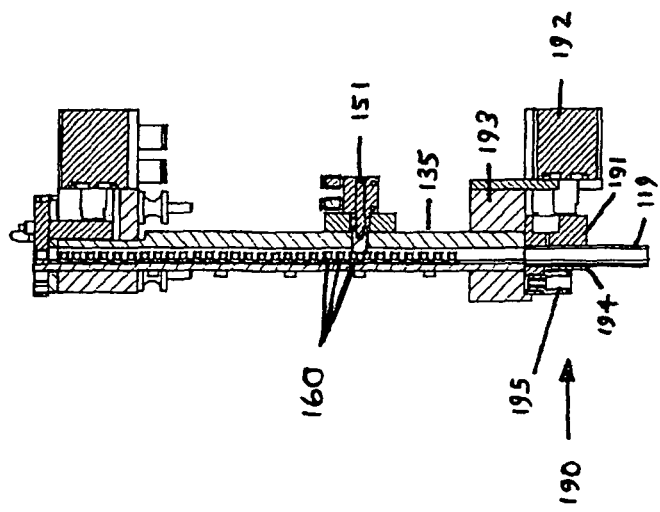
FIGS. 14 to 16 are sectioned side views of an alternative embodiment of the stand-side docking interface and magazine illustrating a filling sequence.
Figure 15:
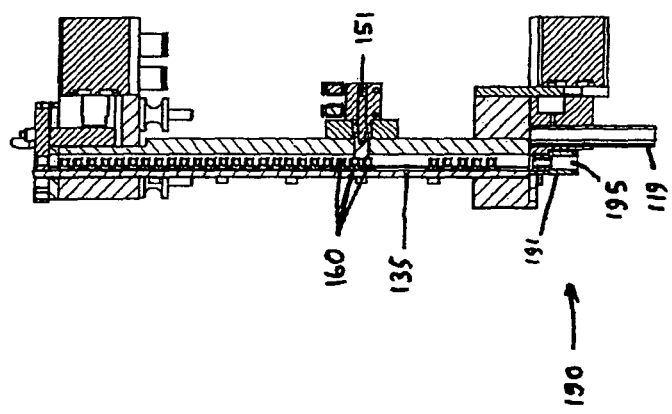
Figure 16:
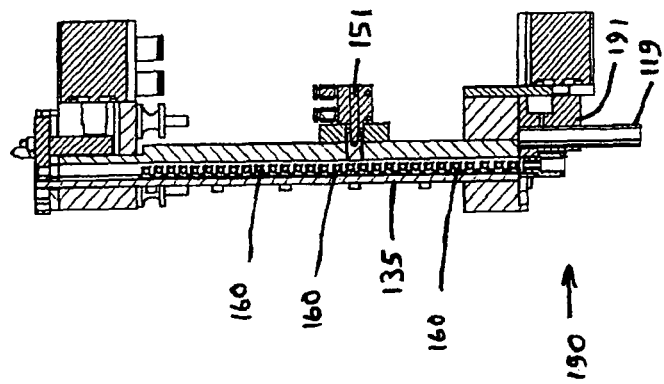

In an alternative embodiment of the stand-side magazine depicted in FIGS. 14 to 16 parts common to the above-described embodiment are given the same reference numerals but increased by 100 and are not further described except in so far as they differ from their counterparts. The main difference is the introduction of a gating device 190 at end of the stand-side delivery tube 119 immediately adjacent to the inlet 136 of the magazine 135. The gating device comprises a sealed gate member 191 that is slidable in a direction transverse to the longitudinal axis of the buffer magazine 135 by an actuator 192 (e.g. an pneumatic cylinder) that is fixed to a block 193 at the bottom end of the stand-side buffer magazine 135. The gate member 191 is penetrated by a first aperture 194 that is designed to receive the end of the delivery tube 119. In operation, the gate member 191 is movable by the actuator 192 between a first position (FIG. 14) in which the delivery tube track is in alignment with the track of the buffer magazine 135 and a second position (FIG. 15) where it is out of alignment. The gating device 190 has an integral blow feed by virtue of a local air blast passage 195 defined in the gate member 191 alongside the first aperture 194. When the gate member 191 is in the closed position the passage 195 is brought into alignment with the magazine track 135. The air blast passage 195 is selectively supplied with pressurised gas from a suitable source under the control of the control system.

The function of the gating device is to retain rivets within the hardened track of the stand-side buffer magazine so as to prevent them from dropping back down in the plastics delivery tube as there can be a tendency for the tube to wear. It also eliminates the need for the probe 151 to hold the rivets in the magazine.

The filling sequence for the embodiment of FIGS. 14 to 16 is initiated by rivets being blown by the main air blast from the outlet of the escapement device along the delivery tube 119 towards the stand-side buffer magazine 135. In one embodiment the control system is configured produces four pulses of air to transport four rivets along the delivery tube 119 and then a fifth longer pulse of air that transports a fifth rivet towards the magazine and then, with the gate in the open position shown in FIG. 14, transfers all five rivets into the magazine 135. With this main blast still applied the probe 151 is extended into the track to detect whether a rivet is present. If no rivet is detected at this position in the track the probe remains in the extended position, thereby retaining the rivets above it, the gate member remains in the open position and another four rivets are transferred as before. On the fifth rivet the air blast is again longer and the probe is simultaneously retracted so as to allow the next group of rivets to travel up the magazine track. Again, with the main air blast still present the probe is extended to trap the rivets and to detect whether the magazine is full. This cycle of events is repeated until the magazine track is filled to a level such that probe detects the presence of a rivet. In FIG. 17 it can be seen that magazine is full to the level of the probe with several rivets below the probe being blow upwards. At this point the gate member is retracted to the closed position as shown in FIG. 18. The air supply to the delivery tube 119 and the pneumatic actuator of the probe is stopped so that the rivets in the magazine drop under gravity and rest against the closed gate (see FIG. 16). The magazine is now ready for the docking operation previously described. Once docked and the transfer gates opened the rivets are transferred across the docking station interface by air being directed to the air blast passage 195 which is now in register with the track of the magazine. It will be appreciated that the sealed nature of the gate member means that the air directed into the air blast passage is prevented from egressing down the delivery tube 119 and so the pressure applied by local blow feed is not impaired.

In this embodiment the provision of the gating device allows the rivets that have dropped back to be retained in the stand-side magazine, which is made of hardened material, thereby avoiding the wear caused by rivets repeatedly dropping back into the plastics delivery tube.

It is to be appreciated that the riveting system may comprise two or more stands or sets of docking apparatus feeding one or more rivet insertion tools.

It is to be understood that the numerous modifications or variations to the above described apparatus and method may be made without departing from the scope of the invention(s) as defined in the appended claims. For example, each of the probes may be of a height that enables it to come into contact with and/or hold more than one rivet. Furthermore, it is to be appreciated that more than one magazine track and tube etc. may be provided in parallel. Moreover, the tool-side buffer magazine and stand-side magazine or storage track may take any appropriate shape. Finally, the probes that retain the fasteners in their respective magazines may take any appropriate form and may be replaced by a suitably directed air (or other gas) curtain that holds the fasteners in place.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method for the automatic feeding of fasteners to a fastener insertion apparatus, the apparatus comprising a fastener insertion tool configured to insert X fasteners in an insertion cycle, a buffer for the temporary storage of fasteners in a track defined by the buffer, the buffer having a capacity of greater than X fasteners, the buffer having an inlet, and a delivery track for transporting fasteners from the buffer towards a fastener delivery passage of the tool for subsequent insertion, the insertion apparatus being movable between an operative position where it is able to insert fasteners via the delivery passage in the tool into a workpiece and a refilling position where it is docked at a docking station so as to permit the buffer to be loaded with fasteners from a storage track of the docking station, the storage track having a capacity of greater than X fasteners and being connected to a source of fasteners, the method comprising:

(a) executing a start-up routine to ensure that the sum of fasteners in the docking station storage track and the buffer track is at least X;

(b) with the insertion apparatus in the refilling position, transferring all fasteners (if any) present in the storage track into the buffer via the inlet;

(c) transferring fewer than X fasteners into the docking station storage track, moving the insertion apparatus to the operative position, and inserting X fasteners from the buffer;

(d) moving the insertion apparatus to the refilling position and transferring all the fasteners (if any) present in the storage track into the buffer via the inlet;

(e) detecting whether the buffer contains at least a predetermined quantity of fasteners, and if so repeating (c) and (d) until it does not, said predetermined quality being less than or equal to said capacity of the buffer;

(f) subsequently filling the docking station storage track with more than X fasteners and moving the insertion apparatus to the operative position and inserting X fasteners from the buffer;

(g) detecting whether the buffer contains at least the predetermined quantity of fasteners, and if not repeating (f) until it does;

(h) subsequently filling the docking station storage track with X fasteners, moving the insertion apparatus to the operative position, inserting X fasteners from the buffer, then moving the insertion apparatus to the refilling position and transferring all the fasteners present in the storage track of the docking station into the buffer via the inlet.

2. A method according to claim 1, wherein in (c) the storage track is filled with X−1 fasteners and in step (f) the storage track is filled with X+1 fasteners.

3. A method according to claim 1, wherein the action of detecting whether the buffer contains at least the predetermined quantity of fasteners is performed using a device for determining whether a fastener is present at a pre-determined location in the buffer.

4. A method according to claim 3, wherein the device is a probe disposed proximate the pre-determined location in the buffer, the probe being moved from a retracted position where it is clear of the track defined by the buffer to an extended position wherein extends into the track through a port in the buffer to detect whether or not a fastener is present.

5. A method according to claim 1, the fasteners having a head and a shank and being loaded into the buffer such that the longitudinal axes of the shanks are substantially perpendicular to the longitudinal axis of the buffer.

6. A method according to claim 1, further comprising expelling from the buffer any fasteners loaded in excess of the predetermined quantity back to the storage track of the docking station, after detecting whether the buffer contains at least the predetermined quantity of fasteners.

7. A method according to claim 1, wherein gas pressure is used to blow the fasteners so as to transfer them from the docking station to the buffer.

8. A method according to claim 1, further comprising escaping fasteners from an end of the buffer opposite the end at which it is loaded and feeding said fasteners to the tool.

9. A method according to claim 1, wherein the quantity of fasteners being delivered into the storage track is detected.

10. A method according to claim 9, wherein the presence of a fastener is detected, as it leaves an escapement mechanism downstream of a source of fasteners.

11. A method according to claim 9, wherein the storage track is connected to a source of fasteners, and the presence of a fastener is detected as it passes a predetermined location between the source of fasteners and the storage track.

12. A method according to claim 1, wherein the fasteners in the buffer are purged before or at the same time as (a) is executed.

13. A method according to claim 1, further comprising:
(i) repeating (h) a predetermined number of times.

14. A method according to claim 13, wherein after (h) is repeated the predetermined number of times, actions (c) to (h) are repeated.

15. A method according to claim 1, wherein in (a) the docking station storage track is filled to capacity.

16. A method for manufacturing a joint or inserting a fastener comprising feeding fasteners to a fastener insertion tool in accordance with the method of claim 1.

\* \* \* \* \*